May 19, 1931.

C. E. LOMAX

Re. 18,076

TELEPHONE SYSTEM

Original Filed Jan. 26, 1925 3 Sheets-Sheet 1

Inventor
Clarence E. Lomax
Chas. W. Candy
Atty.

May 19, 1931. C. E. LOMAX Re. 18,076

TELEPHONE SYSTEM

Original Filed Jan. 26, 1925 3 Sheets-Sheet 2

Inventor
Clarence E. Lomax
Chas. W. Cardy
Atty.

May 19, 1931. C. E. LOMAX Re. 18,076

TELEPHONE SYSTEM

Original Filed Jan. 26, 1925 3 Sheets-Sheet 3

Inventor
Clarence E. Lomax
Chas. W. Candy
Atty.

Reissued May 19, 1931 Re. 18,076

UNITED STATES PATENT OFFICE

CLARENCE E. LOMAX, OF OAK PARK, ILLINOIS, ASSIGNOR, BY MESNE ASSIGNMENTS, TO AUTOMATIC ELECTRIC INC., OF CHICAGO, ILLINOIS, A CORPORATION OF DELAWARE

TELEPHONE SYSTEM

Original No. 1,658,450, dated February 7, 1928, Serial No. 4,691, filed January 26, 1925. Application for reissue filed November 3, 1930. Serial No. 493,194.

The present invention relates to telephone systems in general, but is concerned more particularly with telephone systems in which both main exchanges and branch exchanges are employed; and the broad general object, briefly stated, may be said to consist in the provision of new and improved circuit arrangements, whereby the setting up of connections between a main exchange and a private branch exchange may be accompanied with less likelihood of false operation.

There is one feature of this invention, which, perhaps, does not come under the above head, however, which consists in the arrangement whereby the regular switchboard at a private branch exchange may be supplemented by a very simple night switchboard, presided over by an attendant who may be also the night watchman, or some other similar employee.

According to one feature of the invention, a new and improved single-digit rotary-connector switch of modern design is provided for completing connections with the various groups of main to branch exchange trunk lines. This switch incorporates, among other things, a novel circuit arrangement for preventing the premature application of ringing current to a called line.

Another object is the provision of circuit arrangements in a cord circuit such that one of the strands of the cord circuit is normally open as regards the passage of direct current and remains open after the plug has been inserted into a jack and is closed only by the operation of the ringing key by the operator, which of course takes place in the usual course of events when the operator rings the called substation. This open point is placed in the strand of the cord circuit over which the line switch of the called substation otherwise might operate upon the insertion of the plug into the jack before the bridge cut-off relay of the line switch can operate to disconnect the line relay.

The other objects and features of this case are concerned mainly with the circuit details and these will all be explained fully hereinafter.

Figure 1:
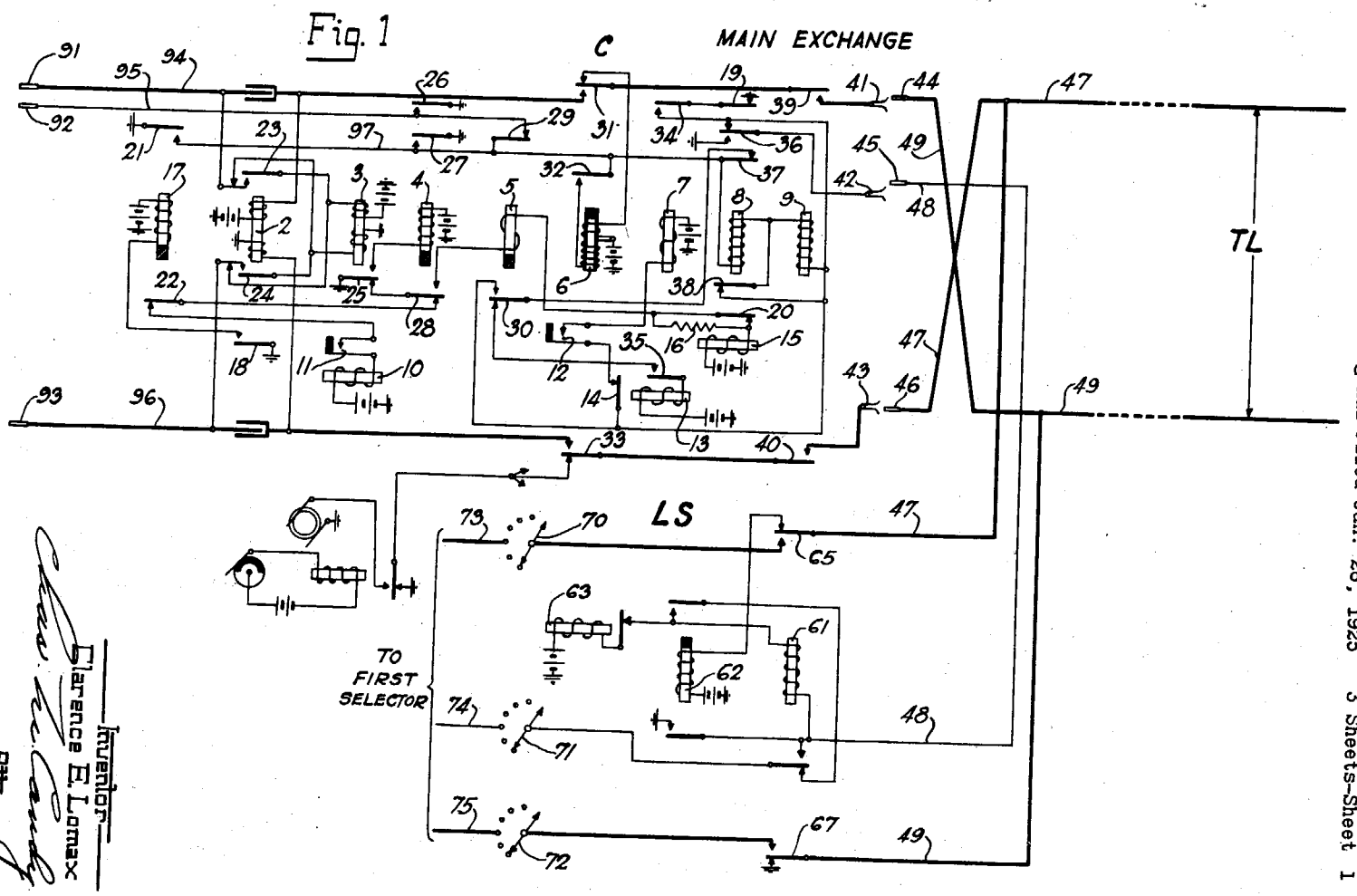
Figure 2:
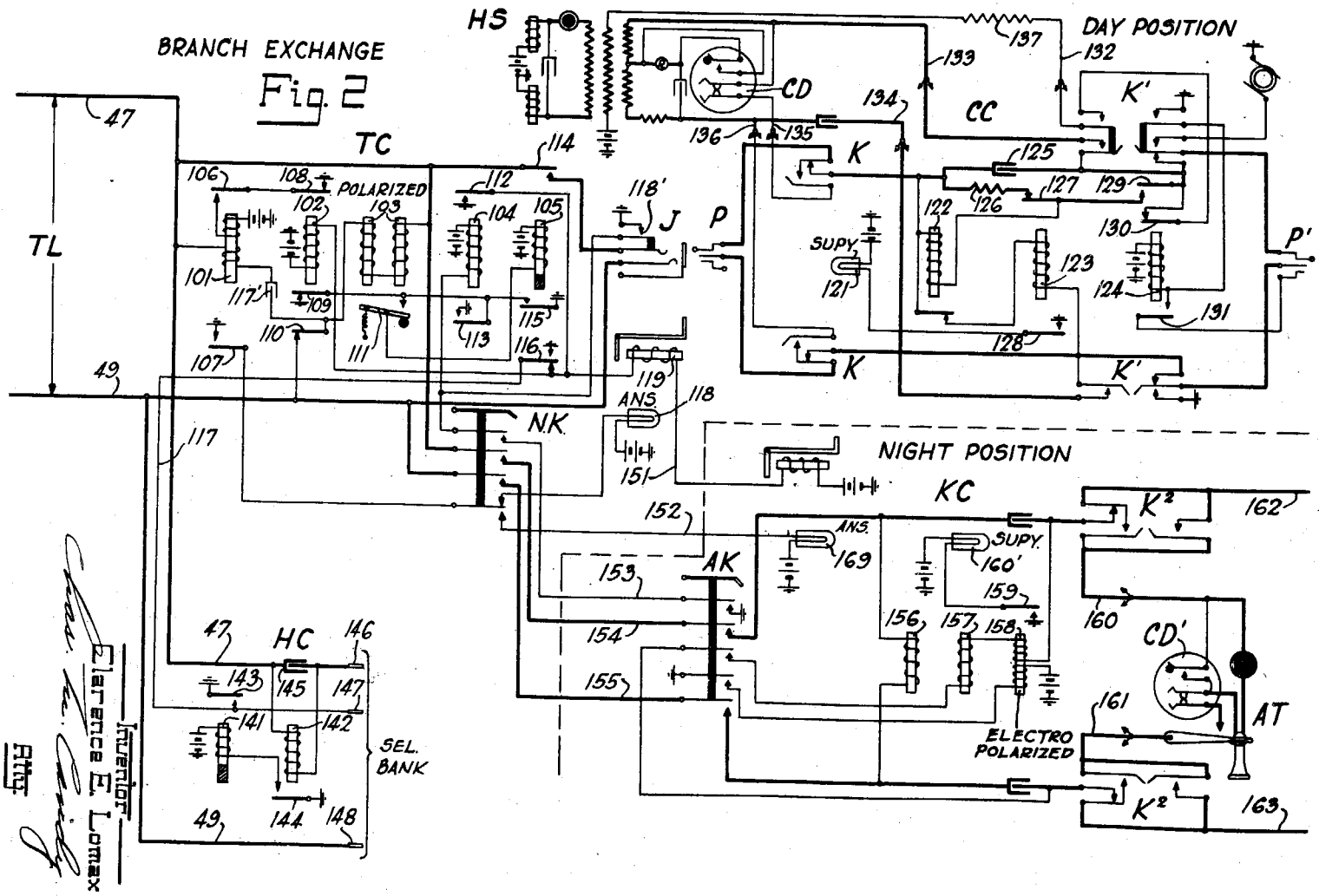
Figure 3:
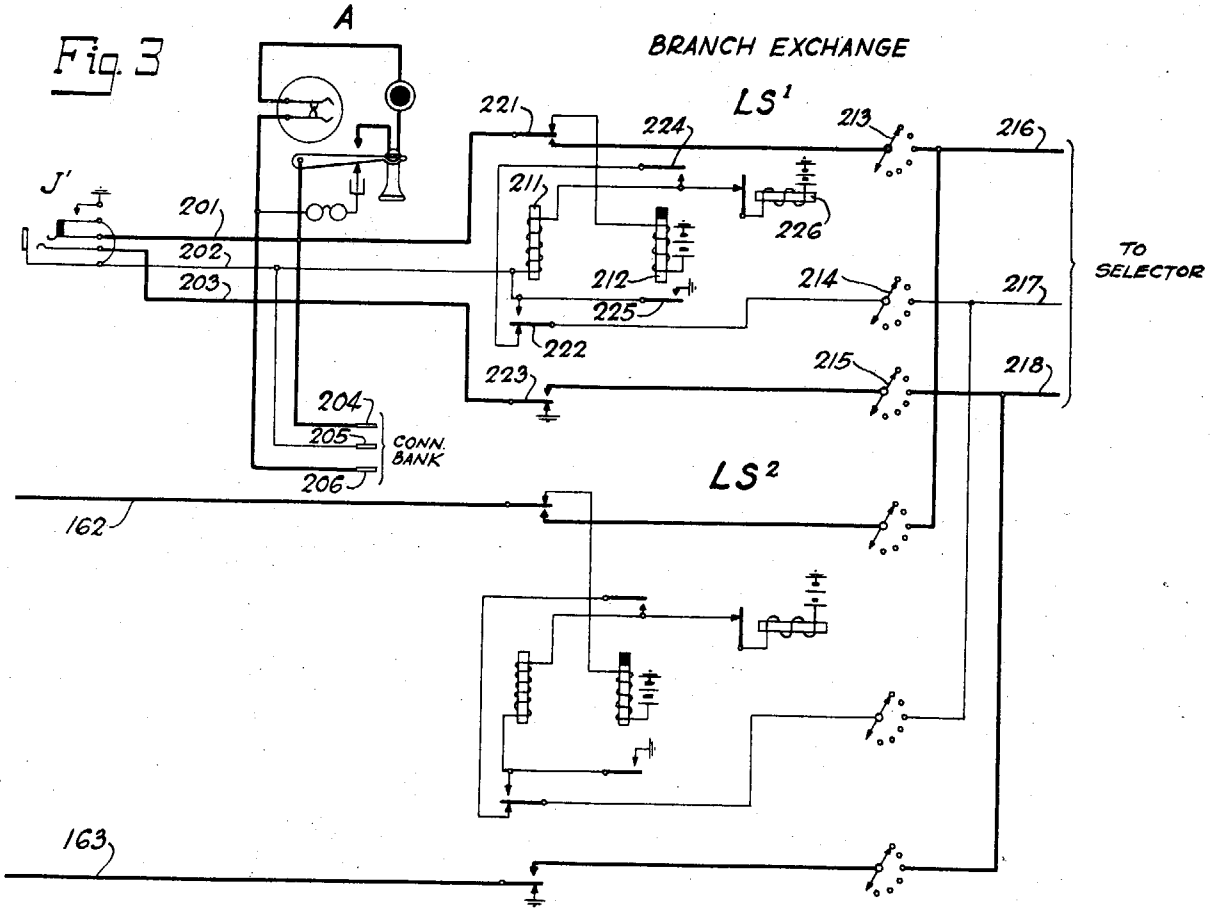

Referring now to the drawings comprising Figs. 1, 2, and 3, Fig. 1 shows equipment located in the automatic main exchange and Figs. 2 and 3 show equipment located in the automatic private-branch exchange, which, however, is not strictly automatic for calls incoming from the main exchange, but may be, from this standpoint, considered as a combined automatic and manual private-branch exchange.

The apparatus shown in Fig. 1 comprises the single-digit rotary connector C which is accessible to the selectors at the main exchange and which has access to the two-way trunk line TL, and others, leading to the branch exchange. Calls originating in the branch exchange and intended for the main exchange are completed over trunk lines, such as the trunk line TL, and, when completed over the trunk line TL, are extended to first selector switches through the medium of the line switch LS.

The equipment shown in Fig. 2 comprises the trunk circuit TC, through which the calls incoming to the branch exchange from the main exchange are completed, and the cord circuit CC which the operator uses to extend incoming calls to the local lines. This drawing shows also the night position at which the key circuit KC is located and through which the calls incoming to the branch exchange from the main exchange are completed during the night when the night key NK individual to the trunk circuit TC is thrown by the operator at the day position when she leaves. This drawing shows also the holding circuit HC which is provided to hold up the established connection when the trunk line TL is seized by a local selector when a call originating in the branch exchange is intended for the subscriber at the main exchange.

Fig. 3 shows the substation A whose line extends to the private branch exchange and terminates there in the line switch LS′, which extends the line of substation A, when calling, to an idle first selector. The line of substation A may be seized by local connectors or by the operator at the day position who, for this purpose, may insert the plug of a cord circuit into the jack J′. Fig. 3 shows also the line switch $LS^2$ which is individual to the key circuit KC at the night position and whose banks are multipled with the banks of the line switch LS′.

In order to complete the general description of the drawings, it may be pointed out that the connector C, Fig. 1, is mechanically of the usual vertical and rotary type of switch and accordingly has its bank contacts arranged in horizontal rows or levels; and that each of the line switches LS, $LS^1$, and $LS^2$ is of the well known rotary type of switch in which the wipers have no normal position, but are moved in a forward direction only, and are advanced upon the back stroke of the associated stepping magnet rather than upon the front stroke.

It will now be assumed that a subscriber in the main exchange desires to converse with the subscriber at substation A in the branch exchange. It will be assumed further that when the calling subscriber at the main exchange removes his receiver and dials the preliminary digits in the number of the branch exchange, a selector under his control seizes the connector C, Fig. 1, at the bank contacts 91—93.

When the connector C is seized, line relay 3, which is bridged across the line conductors of the connector through the normally closed contacts controlled by armatures 24 and 23 of the back bridge relay 2, pulls up over the calling loop and closes at armature 25 a circuit for release relay 4. Release relay 4 energizes and prepares at armature 28 a circuit for vertical magnet 15, at the same time opening a point in the circuit of release magnet 10. At armature 27, relay 4 places ground on the local holding conductor 97 so as to furnish holding ground for various relays of the switch. At armature 26, relay 4 places ground on the release trunk conductor 95, thereby establishing the usual holding circuit for the seizing selector to prevent it and the other switches involved in the connection from releasing prematurely.

It will be noted that the release trunk conductor 95 and the local holding conductor 97 are normally connected together through the resting contact and armature 29 of the series relay 5. The reason for this tie between these two conductors and the provision of contacts for severing it will be explained fully hereinafter.

When the calling subscriber dials the next digit in the desired number, line relay 3 deenergizes a corresponding number of times and, upon each deenergization, closes at armature 25 a circuit through armature 28 and its working contact, series relay 5, and armature 39 and its resting contact for vertical magnet 15. By the operation of vertical magnet 15, the wipers 41—43 are raised step by step and come to rest opposite the desired level of bank contacts. Relay 5 is energized in series with vertical magnet 15 upon the first impulse of current being delivered to the latter, and, being slow acting, maintains its armature attracted throughout the series of impulses. At armature 29, relay 5 disconnects conductor 97 from conductor 95, but this does not have any particular utility at this time. At armature 30 relay 5 opens a point in the circuit of rotary magnet 13 and prepares a circuit for stepping relay 7 which is completed through the interrupter contacts 14 at the off normal contacts 12 as soon as these contacts close, as they do upon the first vertical step of the switch. Responsive to the closure of this circuit, stepping relay 7 energizes and completes a locking circuit for itself at armature 34 and armature 19 and its resting contact, and at armature 35 prepares a circuit for rotary magnet 13.

At the end of the vertical movement, the slow acting series relay 5 falls back and completes at armature 30 a circuit from the grounded holding conductor 97 through armature 37 and its resting contact, and the working contact and armature 35 for rotory magnet 13. Rotary magnet 13 responsively energizes and advances the wipers 41—43 into engagement with the first set of bank contacts in the level opposite which they were previously raised, and, near the end of its stroke, opens at armature 14 the circuit of stepping relay 7. Relay 7 accordingly deenergizes and opens at armature 34 its previously closed locking circuit and opens at armature 35 the circuit of the rotary magnet. When this occurs, the rotary magnet deenergizes and closes its interrupter contacts 14 again.

From this point, the operation depends upon whether the trunk line terminating in the first set of contacts is busy or idle. If it is busy, switching relay 8, which is connected to the grounded conductor 97 on one side and to the circuit of the stepping relay 7 on the other side, is short circuited and does not energize. Stepping relay 7, at this time, energizes from the ground potential encountered upon the busy test contact by test wiper 42 and extended to the circuit of relay 7 through armature 36 of relay 8 and its resting contact. At armature 34, relay 7 again completes its locking circuit, and at armature 35 it again closes the circuit of the rotary magnet, whereupon rotary magnet 13 energizes again and advances the wipers of the switch into engagement with the next set of bank contacts.

This alternate operation of stepping relay 7 and rotary magnet 13 continues as described until an idle trunk is reached, which trunk, it will be assumed, is the one comprising conductors 47—49. When this idle trunk is reached, switching relay 8, being no longer short circuited, energizes in series with stepping relay 7. Stepping relay 7, however, is not operatively energized at this time, on account of the relatively high resistance of switching relay 8. Upon energizing, switching relay 8 inserts the resistance 16 in series with vertical magnet 15 so as to prevent any further operation of the latter in case the calling subscriber should again manipulate his calling device and also to prevent operation of the vertical magnet 15 when the calling subscriber replaces his receiver. The operating circuit is not entirely opened, however, owing to the fact that it is desired to have the series relay 5 operate again when the calling subscriber replaces his receiver, as will be hereinafter pointed out. At armature 37, relay 8 disconnects the grounded locking conductor 97 from armature 30 of series relay 5 so as to prevent this relay from closing a circuit for stepping relay 7 and short circuiting the switching relay 8 when it subsequently energizes again. At armature 36, relay 8 disconnects test wiper 42 from the testing circuit and connects it to ground instead. When this occurs, the combined switching and cut-off relay 61 of the line switch LS energizes through bank contact 45, private normal conductor 48, relay 61, and rotary magnet 63 to battery. When this occurs, relay 61 pulls up and disconnects conductors 47 and 49 from relay 62 and ground, respectively, but the relay does not operate far enough to connect up the wipers of the line switch, owing to the usual interlocking device (not shown) between the armature proper of relay 61 and that of line relay 62.

In the branch exchange, the high resistance polarized relay 103, which is bridged across conductors 47 and 49 of the trunk line TL through armature 110 and its resting contact, now deenergizes due to the removal of battery and ground from the conductors of the trunk line TL at the line switch LS, as above described. Upon deenergizing, relay 103 permits the spring associated with the armature 111 to pull the armature into engagement with the associated contact, thereby closing a circuit for relay 105, which includes the resting contact and armature 109 of relay 102. Relay 105 energizes; connects up conductor 47 to the tip spring of the jack J at armature 114; places a shunt around the resting contact and armature 109 at armature 115; and at armature 116 disconnects release trunk conductor 117 from cut-off relay 102 and connects it to ground instead, thereby making the trunk line TL busy to the branch exchange selectors having access to it.

Returning now to the connector C in the main exchange, as a still further result of the energization of switching relay 8, it removes at armature 38 the shunt from around the wiper connecting relay 9, responsive to which relay 9 energizes and connects up the wipers 41 and 43 at armatures 39 and 40. Relay 9 is rather stiffly adjusted and its inclusion into the circuit in series with relay 8 is delayed as long as possible by adjusting armature 38 to break just before the armature proper of the relay has completed its stroke. These two things combined (in addition to the arrangement whereby armature 36 operates to ground wiper 42 practically as soon as the armature proper of the relay starts to move) result in the delay of the connecting up of wipers 41 and 43 until the combined switching and cut-off relay 61 of the line switch LS has had time to energize responsive to the grounding of test wiper 42 and disconnect the line relay 62 and ground from conductors 47 and 49. This precaution is taken, it may be pointed out, owing to the fact that the connecting up of the wipers 41 and 43 and the grounding of the test wiper 42, at very nearly the same time (which would occur if only one relay were employed to perform the function of both relays 8 and 9) might result, in a large percentage of the connections, in the premature tripping of the ring cut-off relay 6 from the ground on conductor 49 and in the energization of line relay 62 of the line switch LS from the grounded generator lead and over wiper 43, the conductors 47 and 49 being reversed between the trunk line TL proper and the connector banks for a purpose to be later explained.

Ringing current is now intermittently projected out over wiper 43, bank contact 46, and conductor 47 of the trunk line TL to the trunk circuit TC, at which point the polarized relay 103 and the lower winding of relay 101, (with the condenser 117′ in series with it), are both bridged across the conductors of the trunk line TL. The impedance of the polarized relay 103, however, is so high that very little ringing current passes through it. The ringing current which passes through the bridge including the lower winding of relay 101 and condenser 117′ is provided with a return path through armature 110 and its resting contact, conductor 49, bank contact 44, wiper 41, working contact and armature 39, armature 31 and its resting contact, and the upper winding of the ring cut-off relay 6 to battery. Relay 101 energizes responsive to this ringing current and closes a locking circuit for its upper winding at armature 106. At armature 107, relay 101 closes a circuit through the lower spring and its upper contact of night key NK for the answering lamp 118.

Since the polarized relay 103 is bridged across the conductors of the trunk line TL, it energizes from the battery supplied to conductor 49 through the upper winding of the ring cut-off relay 6 of the connector C and ground supplied to conductor 47 over the ringing lead. The ring cut-off relay of the connector is not energized in series with relay 103 owing to the relatively high resistance of the latter. Relay 103 does not operate its armature 111 to the position shown in the drawing owing to the fact that it is energized in a direction opposite to that in which it is normally energized and attempts to pull armature 111 still more snugly into engagement with its associated contact. Accordingly, relay 105 is maintained operated at this time and the trunk line TL is maintained busy at the branch exchange end. It will now be seen that this is the reason for the reversal in the trunk line at the banks of the connector C. Otherwise, the relay 103 would energize again as soon as the wipers of the connector C are connected up by relay 9, as above pointed out.

When the operator perceives the lighted condition of the answering lamp 118, she inserts the answering plug of an idle cord circuit, for example, the plug P of the cord circuit CC, into the jack J. Responsive to this, the springs 118′ of the jack J close, thereby closing a circuit for relay 104. Relay 104 energizes and places a second shunt around the resting contact and armature 109 at armature 113, and at armature 112 closes a circuit for cut-off relay 102. Cut-off relay 102 energizes; opens the locking circuit of relay 101 at armature 108; opens the initial circuit of relay 105 at armature 109, leaving it operated through armatures 113 and 115 in multiple; and at armature 110 disconnects relays 101 and 103 from in bridge of the conductors 47 and 49. Relay 101 now deenergizes and opens the circuit of the lamp 118 at armature 107.

As a further result of the insertion of the plug P into the jack J, the tip and ring conductors of the plug P are connected to the tip and ring conductors of the jack J. Accordingly, the bridged supervisory relay 123, which is bridged across the talking strands of the cord circuit through armature 127 and its resting contact, is now bridged across the conductors 47 and 49 of the trunk line TL. As a result, the ring cut-off relay 6 of the connector C is energized over its upper winding. At armature 32, ring cut-off relay 6 closes a locking circuit for its lower winding, and at armatures 31 and 33, it disconnects the wipers 41 and 43 from its own upper winding and from the ringing lead and connects them instead to the back bridge relay 2. Accordingly, back bridge relay 2 now energizes over the trunk line TL and through the bridged relay 123 in the cord circuit CC; and closes at armature 18 a circuit for relay 17, which relay energizes; places a shunt around armature 27 and its working contact of relay 4 at armature 21; and opens a point in the circuit of release magnet 10 at armature 24.

At armatures 24 and 23, relay 2 reverses the incoming line conductors 94 and 96 as regards their connections with the windings of line relay 3, thereby reversing the direction of the current flow in the calling loop. This reversal in the direction of the current flow in the calling loop does not have any particular utility as regards the actual transfer of talking current, but may be used in certain instances to operate meters and for like operations.

In the cord circuit CC, supervisory relay 123 is energized in series, first with ring cut-off relay 6, and then with back bridge relay 2. Upon energizing, relay 123 removes resistance 126 from in shunt of relay 122 at armature 127, and at armature 128 closes a circuit for the supervisory lamp 121, whereupon lamp 121 becomes lighted.

The operator now throws her key K′ into listening position, thereby connecting up the listening taps 133 and 134 to the strands of the cord circuit. The operator now converses with the calling subscriber and ascertains from him the number of the desired substation. Upon learning that the calling subscriber desires to converse with the subscriber at substation A, the operator tests for the busy or idle condition of the desired line by tapping the tip of the plug P′ against the sleeve of the jack J′. If the desired line is busy, there is a ground potential upon the sleeve of the jack J′ and a circuit is closed through the tip of the plug P′, springs of the key K′, resting contact and armature 130, upper left springs of the key K′, common test conductor 132, high resistance 137, and the tertiary winding of the operator's induction coil to battery. Accordingly, the operator hears a click in her receiver R each time the tip of the plug P′ is touched against the sleeve of the jack J′, and another click each time the connection is broken between the two. In this case, the operator informs the calling subscriber that the desired line is, for the time being, inaccessible and the calling subscriber replaces his receiver with the result that the established connection is broken.

Assuming now that the desired line is idle when called, there is no ground potential on the sleeve of the jack J′, but rather a battery potential on this sleeve through the relay 211 of the line switch LS′, and the associated stepping magnet. Accordingly, the operator hears no click when she tests the condition of the line and she inserts the plug P′ into the jack J′. When this occurs, the upper contacts of the jack J′ place ground on the sleeve of the jack J′, thereby closing a circuit over private normal conductor 202 for relay 211 of the line switch LS′. Relay 211 accordingly operates far enough to disconnect the associated line relay 212 and the ground from the conductors of the desired line, but does not operate any further on account of the previously mentioned interlocking device between the armatures of the two relays of the line switch.

The operator now throws the key K′ into ringing position, thereby applying ringing current to the called line to ring the bridged bell at the substation A.

It will be noted that the upper strand of the cord circuit CC is normally open as regards the passage of direct current, this strand being closed through the condenser 125 to permit the operator to converse with the calling subscriber when she throws her listening key K′. Accordingly, there is no danger of the line switch on the called line being operated responsive to the insertion of the plug P′ into the jack, as might occur if the condenser 125 were shunted.

When the key K′ is thrown into ringing position, the called substation is signalled in the usual manner and, in addition, the circuit is closed at the upper right contacts of the key K′ for relay 124, which energizes and locks itself to the sleeve conductor of the plug P′ at armature 131 and at armature 129 connects the supervisory relay 122 across the open point in the upper strand of the cord circuit preparatory to furnishing talking battery to the called substation. Relay 124 also opens the above mentioned busy test circuit at armature 130.

When the subscriber at substation A removes his receiver, a direct current bridge is placed across the conductors of his line through the receiver, transmitter, and calling device. Since the plug P′ is now in the jack J′, the placing of the direct current bridge across the conductors of the line of substation A results in the placing of direct current bridge across the strands of the cord circuit CC in multiple with the supervisory bridge which includes the armature and contact of relay 122 and the supervisory relay 123. The series supervisory control relay 122 is included in the circuit in series with the bridge at the called substation, as it is now shunted around the condenser 125 through the working contact and armature 129 of relay 124. Accordingly, relay 122 energizes in series with the called line and disconnects relay 123 from in bridge of the talking strands of the cord circuit. Relay 123 now deenergizes and extinguishes the supervisory lamp 121 at armature 128, thereby giving answering supervision to the branch exchange operator. As a further result of the deenergization of relay 123, it connects the resistance 126 around relay 122 at armature 127 so as to afford a better talking circuit. The talking current accordingly passes through condenser 125 and resistance 126 in multiple.

The calling and called subscribers may now converse with each other as desired.

When the conversation is completed, the two subscribers replace their receivers.

It will be assumed that the calling subscriber is the first to replace his receiver. When the receiver is replaced at the calling substation, line relay 3 of the connector C falls back and places ground as usual on the operating circuit at armature 25, thereby closing a circuit as before for vertical magnet 15. Vertical magnet 15 is not operated at this time, however, on account of the fact that the relatively high resistance 16 has been inserted into the circuit in series with the vertical magnet 15 at armature 20 of switching relay 8. Series relay 5, however, operates in series with resistance 16 and vertical magnet 15. It will be noted that the operation of armature 30 is ineffective at this time on account of the fact that armature 30 is disconnected at armature 37 of switching relay 8. At armature 29, relay 5 disconnects the grounded locking conductor 97 from the grounded release trunk conductor 95 so as to permit the release trunk conductor to be ungrounded ahead of the ungrounding of conductor 97.

After the interval for which it is adjusted, release relay 4 falls back and opens the operating circuit and prepares a circuit for the release magnet 10 at armature 28. Series relay 5 does not fall back immediately, however, owing to the fact that it is slow acting. At armature 27, relay 4 removes ground from conductor 97, which, however, remains grounded at armature 21 of relay 17. At armature 26, relay 4 removes ground from release trunk conductor 95, thereby permitting the preceding switches in the connection to be released in the usual and well known manner.

At the end of the interval for which it is adjusted, slow acting series relay 5 falls back and connects the grounded holding conductor 97 to release trunk conductor 95 at armature 29, thereby rendering the connector C busy to the selector switches having access to it. The switches involved in the connection up to but excluding the connector C have now been released, but the connector C is maintained operated to maintain the trunk line TL busy at the main exchange end thereof, thereby maintaining the combined switching and cut-off relay 61 of the line switch LS operated so as to prevent the line switch LS from operating at this time.

When the called subscriber at substation A replaces his receiver, back bridge relay 2 of the connector C and the series supervisory control relay 122 of the cord circuit CC both fall back. Upon falling back, back bridge relay 2 of the connector C, in addition to straightening out the connection between the incoming talking conductors and the windings of line relay 3, at armatures 24 and 23 opens the circuit of relay 17 at armature 18, but relay 17, being slow acting, does not deenergize immediately.

In the branch exchange, the deenergization of series relay 122 results in relay 123 being bridged across the talking conductors of the cord circuit again. When this occurs, the back bridge relay of the connector C in the main exchange again pulls up in series with relay 123 in the cord circuit CC which pulls up also. Back bridge relay 2 of the connector C again closes the circuit of the associated slow acting relay 17 at armature 18 before the slow acting relay 17 has had time to fall back.

In the cord circuit CC, the energization of relay 123 results in the removal of the resistance 126 from in shunt of relay 122 at armature 127 so as to enable relay 122 to energize again readily in case the calling subscriber is not finally hanging up his receiver but is merely attempting to flash the local operator. As a further result of the energization of relay 123, the circuit of the supervisory lamp 121 is closed at armature 128, whereupon the lamp 121 becomes lighted to inform the operator that the subscriber at substation A has replaced his receiver.

Upon noting the lighted condition of the lamp 121, the attendant operator pulls down the cord circuit CC.

Responsive to the removal of the plug P from the jack J, the circuit of the back bridge relay 2 of the connector C is opened, whereupon relay 2 falls back.

As a further result of the removal of the plug P from the jack J, contacts 118′ open the circuit of relay 104, whereupon relay 104 falls back; opens one point in the circuit of relay 105 at armature 113, leaving relay 105 energized through armature 115 and its working contact; and at armature 112, opens the circuit of relay 102. Relay 102 accordingly falls back and connects the ring up winding of relay 101 and the polarized relay 103 across the conductors of the trunk line TL.

At the end of the interval for which it is adjusted, slow acting relay 17 of the connector falls back due to the opening of its circuit at armature 18, with the result that the connector C is released. Ground is accordingly removed from private normal conductor 48 of the line switch LS at contact 45, whereupon the combined switching and cut-off relay 61 of the line switch LS falls back and connects ground to conductor 49 and connects line relay 62 to conductor 47. It will be noted that the battery connections to conductors 47 and 49 are now just opposite to the battery connections to these conductors prior to the release of the connector C. This quick reversal of the battery connections to the conductors of the trunk line TL has a tendency to operate relay 101, whose lower winding is connected across these conductors in series with the condenser 117 of the trunk circuit TC. This relay does not operate at this time on account of its relatively stiff adjustment, which adjustment, however, is not stiff enough to prevent its operation in response to the ringing current projected out over trunk line TL from the main exchange as hereinbefore pointed out.

In the trunk circuit TC, relay 103 now operates and brings its armature 111 into the position shown in the drawings on account of the reversal of the battery connections to the trunk line TL, as above pointed out. Accordingly, relay 103 opens the circuit of slow acting relay 105 at armature 111 with the result that relay 105 deenergizes after a slight interval and disconnects release trunk conductor 117 from ground and connects it instead to cut-off relay 109 at armature 116. The trunk line TL is now in its normal condition.

It will now be assumed that the subscriber at substation A desires to converse with a subscriber in the main exchange and that he accordingly removes his receiver and dials the number of the subscriber in the main exchange, as listed in the telephone directory, preceded by the digit necessary in order to obtain connection with a first selector in the main exchange.

When the subscriber at substation A removes his receiver, a circuit is closed across the conductors of his line for line relay 212 of the line switch LS which energizes and places ground on private normal conductor 202 at armature 225, thereby making the calling line busy to the connectors in the branch exchange and to the attendant operator. As a result of the placing of ground on private normal conductor 202, a circuit is closed for switching relay 211 in series with stepping magnet 225. As a further result of the energization of relay 212, it connects test wiper 214 to the junction of switching relay 211 and magnet 226 at armature 224.

Assuming the calling line to be idle, this latter operation of line relay 212 does not have any particular effect at this time and switching relay 211 energizes, seizing the trunk.

Assuming on the other hand that the trunk upon which the wipers of the line switch are standing is busy, switching relay 211 is short circuited by the ground potential encountered on the busy test contact by test wiper 214 and does not energize. In this case, this same ground potential is applied through the self-interrupting contacts to stepping magnet 225, which operates in a buzzer-like manner to advance the wipers step by step in search of an idle trunk.

When an idle trunk is reached, which trunk, it will be assumed, is the one comprising conductors 216—218 and extending to an idle first selector, switching relay 211, being no longer short circuited on account of the fact that there is no ground potential on the test contact now encountered by test wiper 214, energizes in series with stepping magnet 226. Stepping magnet 226 does not energize at this time on account of the relatively high resistance of switching relay 211. Upon energizing, switching relay 211 disconnects test wiper 214 from the junction of its own winding and that of stepping magnet 226 and connects it instead to the grounded private normal conductor 202, thereby making the seized trunk busy immediately; and at armatures 221 and 223 disconnects the line conductors from the winding of line relay 212 and ground and extends them by way of wipers 213 and 215 to trunk conductors 216 and 218, respectively, of the seized trunk. Responsive to this operation, the line and release relays of the seized selector (not shown) operate and the latter places ground on the release trunk conductor 217, thereby establishing the usual holding circuit for the line switch LS′ before the slow acting line relay 212 has had time to fall back.

When the calling subscriber manipulates his calling device in accordance with the digit necessary to obtain connection with the main exchange, the seized selector switch raises its wipers opposite the corresponding level of bank contacts and rotates them in search of an idle trunk. In this case it will be assumed that the trunk line TL, which, among other trunks, is accessible to the local selectors through holding circuits (such as HC), is seized at bank contacts 146—148. When this occurs, the seizing selector switch places ground on release trunk conductor 117 through the medium of bank contacts 147, thereby closing a circuit through armature 116 and its resting contact of relay 105 for cut-off relay 102. Cut-off relay 102 accordingly pulls up and disconnects the ring-up relay 101 and the polarized relay 103 from in bridge of conductors 47 and 49 at armature 110. Relay 103 deenergizes and the spring associated with armature 111 brings the said armature 111 into engagement with its associated contacts, but no circuit is closed for relay 105 at this time, owing to the fact that the working contact of armature 111 is ungrounded at armature 109 of cut-off relay 102. The visual busy signal 119, in series with the visual busy signal at the night position, is energized in multiple with cut-off relay 102 so as to inform the operator at the day position that the trunk line TL is busy.

As a further result of the seizure of the trunk line TL by the local selector through the medium of the bank contacts associated with the holding circuit HC, the conductors of the calling line are extended to bank contacts 146 and 148 which are connected to conductors 47 and 49. Accordingly, line relay 62 of the line switch LS in the main exchange now energizes over the trunk line TL in series with relay 142 of the holding circuit HC, with the result that relay 142 closes at armature 144 a circuit for relay 141 which pulls up and grounds conductor 117 at armature 143 before the slow acting release relay of the seizing selector has had time to fall back.

In the main exchange, private normal conductor 48 of the line switch LS is grounded in the usual manner by line relay 62. Also, the line switch LS seizes an idle first selector in the manner similar to that described in connection with the operation of the line switch LS′ in the branch exchange. Assuming that the first selector seized is the one reached by way of conductors 73—75, this selector is prepared for operation in the usual manner and grounds the release trunk conductor 74, thereby closing the usual holding circuit for the line switch LS before the slow acting line relay 62 has had time to fall back.

The calling subscribed now manipulates his calling device in accordance with the directory number of the desired subscriber in the main exchange, with the result that the desired connection is completed and the desired subscriber's bell is rung by the connector switch in the usual manner.

Relay 142 of the holding circuit HC responds to the dial but the slow acting relay 141 keeps the release trunk conductor 117 grounded.

When the called subscriber responds, the ringing current is cut off by the connector in the usual manner and the talking circuit is completed, whereupon the two subscribers may converse with each other in the usual manner.

When the conversation is completed, the two subscribers replace their receivers.

When the receiver is replaced at substation A, the circuit of the line relay of the connector in use is broken, as well as the circuit of the series relay 142 of the holding circuit HC. Responsive to the deenergization of the line relay of the connector in the main exchange, the switches in the main exchange, including the line switch LS are released.

Responsive to the deenergization of the series relay 142 of the holding circuit HC in the branch exchange, the circuit of relay 141 is opened with the result that this slow acting relay deenergizes after an interval and removes ground from release trunk conductor 117 at armature 143. When this occurs, the trunk line TL is rendered accessible to the local selector switches again and cut-off relay 102 of the trunk circuit TC, as well as the visual busy signal 119 and the corresponding signal at the night position, deenergizes. The entire connection is now released.

In case the subscriber at substation A so desires, he may call the local operator through the medium of an ordinary telephone (not shown) at her switchboard and request that she call a particular main exchange number for him and then call his back when she gets that number.

Assuming that this is done, the operator notes the condition of the various visual indicators, such as 119, at her position, and she takes the plug of an idle cord circuit, for example, the plug P of the cord circuit CC and inserts it into the jack J. The closure of contacts 118′ of the jack J results in the operation of relay 104. Relay 104 closes at armature 112 a circuit for cut-off relay 102, at the same time placing ground on conductor 117 through the resting contact and armature 116. Relay 102 cuts the trunk circuit bridges off from conductors 47 and 49, whereupon relay 103 restores and closes a circuit for relay 105 from armature 113 and its working contact. Relay 105 energizes and disconnects conductor 117 from ground in multiple with relay 102 and the visual signals and connects it directly to ground at armature 116; closes a locking circuit for itself at armature 115 independent of armature 113 and its working contact; and at armature 114 closes a point in the negative talking conductor.

When the negative talking conductor is finally connected up, a bridge is closed across conductors 47 and 49 which includes the tip and ring contacts of the jack J, the corresponding contacts of the plug P, contacts of the calling device key K, and the supervisory relay 123 which is bridged across the talking strands of the cord circuit CC through the contacts of relay 122. Relay 123 accordingly energizes in series with the line relay of the line switch LS on the distant end of the trunk line TL and closes a circuit for the supervisory lamp 121 at armature 128.

In the main exchange, the line switch LS operates in the usual manner and seizes an idle first selector.

The operator now throws the calling device key K, thereby disconnecting the tip and ring conductors of the plug P from the remaining part of the cord circuit and connecting them instead to the common calling device taps 135 and 136 which are connected together through the sending contacts of the calling device CD and the secondary windings of the operator's induction coil.

The operator now manipulates her calling device CD in accordance with the digits in the number of the desired substation, with the result that the desired connection is completed in the usual manner.

After having communicated with the called subscriber and having told him to wait a few seconds, the operator inserts the plug P′ into the jack J′ and signals the subscriber at substation A.

When the subscriber at substation A answers, relay 122 pulls up and disconnects relay 123 from in bridge of the talking strands of the cord circuit and relay 123 falls back, extinguishing the lamp 121 at armature 128 and shunting relay 122 by the resistance 126 at armature 127.

The calling and called subscribers may now converse with each other in the usual manner, and, when the conversation is completed, they both replace their receivers.

When the receiver is replaced at substation A, relay 122 falls back and again bridges relay 123 across the talking conductors, whereupon relay 123 pulls up and lights the lamp 121 and removes the resistance 126 from in shunt of relay 122. Accordingly, if the subscriber at substation A raises his receiver again from the hook, relay 122 energizes again readily because it is not at this time shunted by resistance 126, and the lamp 121 is extinguished.

In case the subscriber at substation A desires to converse with the operator, he lowers and raises his switchhook several times, with the result that the lamp 121 becomes lighted and extinguished several times, attracting the attention of the operator who may throw her listening key and converse with the subscriber and carry out his desires.

When the operator leaves her switchboard at the end of the business day, she operates the night key NK, thereby connecting the talking conductors of the trunk line TL to the attendant's circuit at the night position. The night key NK at its upper contact prepares a circuit for operating relay 104 from the night position, and at its lower contact disconnects armature 107 of ring-up relay 101 from the answering lamp 118 at the day position and connects it to the answering lamp 169 at the night position. Accordingly, all calls incoming to the branch exchange from the main exchange over the trunk line TL after the night key NK is thrown, are handled at the night position. The attendant at the night position is not usually a regular operator but is, in many cases, a night watchman, or someone else holding a similar position. Accordingly, the night position is not equipped with cord circuits as is the day position, but is equipped rather with a simple key circuit by means of which the night attendant may, upon answering a call, dial the local number of the desired subscriber, thereby extending the connection.

Assuming now that the night key NK is thrown and that the trunk line TL is seized by a connector in the main exchange, relay 103 falls back in the usual manner responsive to the seizure of the trunk line TL and closes a circuit for relay 105 which pulls up and makes the trunk line TL busy in the branch exchange.

When the ringing current is projected over the trunk line TL by the seizing connector switch, the ring-up relay 101 responds and becomes locked up at armature 106 through armature 108. At armature 107, relay 101 closes a circuit through the lower spring and its lower contact of the night key NK for the answering lamp 169 at the night position. The attendant at the night position, upon noting the lighted condition of the lamp 169, operates the answering key AK. The upper contact of the key AK closes a circuit through the upper contact of the key NK for relay 104 which thereupon energizes and closes at armature 112 a circuit for cut-off relay 102 which pulls up with the hereinbefore described results. As a further result of the operation of the key AK, it closes, at its second pair of contacts from the bottom, a circuit for the polarizing winding of the electro-polarized relay 158. This winding is composed of a comparatively small number of turns of wire having a relatively high resistance and it is, therefore, unable to operate the relay unassisted. At its springs connected with conductors 154 and 155 the key AK connects these conductors to the talking conductors of the key circuit KC, thereby establishing a bridge through the impedance 156 for operating the ring cut-off and back bridge relays (for example, relays 6 and 2 of the connector C, Fig. 1) of the seizing connector.

As a further result of the operation of the key AK, a bridge is closed across conductors 162 and 163 at the middle contacts of the key AK which includes the back bridge impedance 157 and the upper winding of the electro-polarized relay 158. Accordingly, the line relay of the line switch $LS^2$ energizes through this bridge with the result that the line switch $LS^2$ seizes an idle selector switch in the usual manner. The direction of the current flow through the upper winding of the electro-polarized relay 158 is such that this winding assists the polarizing winding in operating the relay. This relay closes at armature 159 a circuit for the supervisory lamp 160′, which accordingly becomes lighted.

The attendant now throws the key $K^2$ into listening position, thereby connecting conductors 160 and 161 to conductors 162 and 163. Talking battery is supplied to the attendant's circuit AT (which is an ordinary automatic telephone with the ringer removed) in multiple with the bridge across the talking conductors including impedance 157. The attendant now converses with the calling subscriber and ascertains the number of the subscriber with whom he desires to converse.

Assuming that the called subscriber is still at the plant, the attendant throws the key $K^2$ into its opposite position, thereby connecting conductors 160 and 161 to conductors 162 and 163 to the exclusion of the holding bridge including the impedance 157.

The attendant now operates the calling device CD′ in accordance with the local number of the called branch exchange subscriber with the result that the connection is extended to his line in the usual manner.

When the called subscriber responds, the connector switch in use reverses the direction of current flow in conductors 162 and 163. When this occurs, the lines of force produced by the upper winding of relay 158 oppose those produced by the lower winding of the relay and the relay retracts its armature 159, thereby extinguishing the lamp 160′.

The two subscribers may now converse with each other as desired and when the conversation is terminated, they both replace their receivers.

When the receiver is replaced at the branch exchange substation, the connector in use reverses the direction of current flow in the conductors 162 and 163, whereupon the electro-polarized relay 158 again attracts its armature 159 and lights the supervisory lamp 160′. When the attendant sees this, he restores the key AK, thereby opening the bridge across the conductors 162 and 163 and permitting the local switches to release. The release of the main exchange connection takes place in this case in the same manner that it took place in the preceding case.

What is claimed is:

1. In a telephone system, an automatic connector switch having line wipers and a test wiper, a line accessible to said connector switch, a line relay and a cut-off relay for said line, a relay in said connector switch energized responsive to the idle condition of said line when the wipers are brought into engagement with the contacts thereof to close a circuit for said cut-off relay over said test wiper, and a second relay energized responsive to the energization of said first relay to connect the line wipers to the connector switch.

2. In a telephone system, a cord circuit having two talking strands and a guarding conductor, an open point in one of the strands of said cord circuit, a plug and a jack for connecting said circuit to a line, a ringing key in said cord circuit, a relay operated by the ringing key to close the open point subsequent to the insertion of the plug into the jack, and contacts on said relay for closing a locking circuit for itself independent of the ringing key but including said guarding conductor.

3. In a telephone system, a subscriber's line, a line switch and a jack individual to said line, a line relay in said switch responsive to the closure of a bridge across said line, a cut-off relay in said switch, a cord circuit having a plug, a circuit excluding said plug for energizing said cut-off relay responsive to the insertion of said plug in said jack, a normally open bridge across the talking contacts of said plug, and means controlled by the operator after the plug is inserted for closing said normally open bridge.

4. In a telephone system, a subscriber's line, a line switch and a jack individual to said line, a line relay in said switch responsive to the closure of a bridge across said line, a cut-off relay in said switch, a cord circuit having a plug, a circuit for energizing said cut-off relay responsive to the insertion of said plug in said jack, a normally open bridge across the talking contacts of said plug, a relay for closing said normally open bridge, means including a key for energizing said last mentioned relay, and a locking circuit for holding said relay energized in parallel with said cut off relay.

5. In a telephone system, a subscriber's line, a line switch and a jack individual to said line, a line relay in said switch responsive to the closure of a bridge across said line, a cut-off relay in said switch, a cord circuit having a plug, a circuit for energizing said cut-off relay responsive to the insertion of said plug in said jack, a normally open bridge across the talking contacts of said plug, a self-locking relay for closing said normally open bridge, and a key for closing an initial energizing circuit for said locking relay.

6. In a telephone system, a subscriber's line terminating in a jack, a cord circuit having one contact of the plug normally free of battery or ground, a line switch for said line having a line relay normally connected to the line conductor engaged by said plug contact when the plug is inserted in said jack, a cut-off relay energized when the plug is inserted in said jack to disconnect said line relay, and means controlled by the operator after the plug is inserted for connecting said plug contact to one pole of the battery.

7. In a private branch exchange, day and night operator's positions, a trunk line incoming from a main exchange and terminating in a jack at said day position, a branch of said trunk line extending to said night position, a branch extension extending through said night position to an automatic switch, a normally open key inserted between said trunk line and said branch at said day position, and a second normally open key inserted between said branch and the said extension at said night position.

8. In a private branch exchange, day and night operator's positions, a trunk line incoming from a main exchange and terminating in a jack at said day position, a branch of said trunk line extending to said night position, a branch extension extending through said night position to an automatic switch, a signal at said day position normally responsive to a call over said trunk line, a normally non-responsive signal at said night position, and a key at said day position for rendering said first signal non-responsive and said second signal responsive.

9. In a private branch exchange, day and night operator's positions, a trunk line incoming from a main exchange and terminating in a jack at said day position, a branch of said trunk line extending to said night position, a branch extension extending through said night position to an automatic switch, subscribers' lines in said branch exchange, manual switching equipment for extending calls from said jack to said lines when the day position is in use, and automatic switches cooperating with said first automatic switch to automatically extend calls from said trunk line to said lines when the night position is in use.

10. In a branch exchange, day and night positions, a trunk line having terminals at both positions, trunk signals at said positions, means for rendering either of said signals responsive to calls depending on which position is in use, subscribers' lines, manual equipment for connecting said trunk line with said lines when the day position is in use, and automatic switches for connecting said trunk line with said lines when the night position is in use.

11. A one digit side switchless rotary connector switch comprising a magnet for directively operating it to select a group of trunks, a second magnet automatically responsive to the cessation of the directive operation for automatically operating the switch to select an idle trunk, a switching relay automatically energized when the idle trunk is found to connect the switch wipers and complete a ringing circuit, a ring cut-off relay controlled over the selected trunk to open the ringing circuit and close the talking conductors, and a back bridge relay for feeding current to the selected trunk.

12. In a "release by last party" connector switch, a switching relay, a ring cut-off relay, a conductor for supplying current to lock said relays energized, an incoming release trunk conductor normally connected to said locking conductor, means for operating and releasing said switch, and means for separating said conductors while the switch is being released.

13. In a "release by last party" two-motion connector switch, a ring cut-off relay, a switching relay, said relays being of the self-locking type, a conductor for supplying current to the locking windings of said relays, an incoming release trunk conductor normally connected to said locking conductor, a "change-over" relay, and contacts on said "change-over" relay for separating said conductors.

14. In a "release by last party" connector switch, a release magnet and circuit therefor, a back bridge relay, a slow acting relay, means for energizing said first relay while the slow acting relay is deenergized, means controlled by said first relay when energized for energizing said slow acting relay, and contacts on said slow relay for opening said circuit.

15. In an automatic switch, line wipers and a test wiper, said line wipers being normally disconnected from the talking conductors of said switch, operating means for said switch, a relay energized responsive to the completion of the operation of said switch, a second relay energized responsive to the energization of said first relay, contacts on said first relay for placing a potential on said test wiper, and contacts on said second relay for connecting up said line wipers.

16. In a telephone system, two serially related switches for setting up a connection, a release trunk conductor extending between said switches, a local test conductor in the second switch normally connected to said release conductor, means independent of the calling party for applying a holding potential to said local test conductor, and means controlled by the calling party for separating said conductors to release said first switch.

17. In a telephone system, a calling and a called line, automatic switches, a connector, means for operating said switches and connected to complete a connection between the said lines, a back bridge relay in said connector controlled by the called party, means in said connector for establishing a holding circuit to hold said switches in their operated positions, means responsive to the calling subscriber hanging up his receiver for opening said holding circuit to permit said switches to release to normal, and a slow acting relay controlled by said back bridge relay to prevent the release of said connector and to make the connector busy to switches having access thereto.

18. In a telephone system, a single digit rotary connector switch having directive primary and automatic secondary movements, means for operating said switch in its directive primary movement to select a group of lines, a change-over relay in said switch energized during the primary movement and deenergized responsive to the completion thereof for automatically starting said secondary movement to select an idle line in the group, a guarding conductor for said switch having guarding potential connected thereto independent of control of the calling line, and means controlled by said change-over relay for momentarily removing guarding potential from said guarding conductor responsive to the calling party hanging up his receiver before the called party.

19. In a telephone system, a single digit rotary connector switch having directive primary and automatic secondary movements, means for operating said switch in its directive primary movement to select a group of lines, a change-over relay in said switch energized during the primary movement and deenergized responsive to the completion thereof for automatically starting said secondary movement to select an idle line in the group, a back-bridge relay in said switch for feeding talking battery to the called line, a guarding conductor for said switch having guarding potential connected thereto independent of control of the calling line, means controlled by said change-over relay for momentarily removing guarding potential from said guarding conductor responsive to the calling party hanging up his receiver before the called party, and means controlled by said back-bridge relay for thereafter maintaining guarding potential on said guarding conductor until the called party hangs up his receiver.

20. In a telephone system, a calling line, a called line, automatic switches, a connector, an operator's position, a trunk line accessible to said connector and terminating in a jack at said position, means controlled by the calling subscriber for operating said switches and connector to extend a connection to said trunk, a cord circuit for connecting with said jack to complete the connection to the called line, a back-bridge relay in said connector controlled by the called subscriber, means in said connector controlled by the calling subscriber for establishing a holding circuit for said switches and connector, means for releasing said switches to normal responsive to the calling subscriber hanging up his receiver, means for operating said back bridge relay responsive to the called subscriber hanging up his receiver, means in said cord circuit for again operating said back bridge relay, and a relay controlled by said back bridge relay for controlling the release of said connector and for making said connector busy to switches having access thereto until said cord circuit is removed from said jack.

21. In a connector switch having line wipers and a test wiper, talking conductors normally disconnected from said line wipers, a test relay, a switching relay, contacts on said test relay normally short circuiting said switching relay, means for operating said test relay to apply a guarding potential to said test wiper and to remove said short circuit from said switching relay, said switching relay operates in series with said test relay responsive to the removal of said short circuit, and means controlled by said switching relay for connecting said talking conductors to said line wipers.

22. In a telephone system, a first exchange, a second exchange, a two way two conductor trunk connecting the two exchanges, normally connected branches of said trunk terminating in automatic switches at said first exchange and in an automatic switch and a jack at the second exchange, means for completing connections in two directions over the normally connected branches of said trunk, a normally disconnected branch of said trunk at said second exchange terminating in an automatic switch, means for connecting said normally disconnected branch to said trunk, and means for completing a connection over said trunk and its normally disconnected branch in one direction.

23. In a cord circuit, a pair of talking conductors, a relay connected in series with one of said talking conductors, a supervisory signal, a supervisory relay having contacts for controlling the operation of said signal and having contacts normally closing a shunt circuit around said first relay; said supervisory relay connected in bridge of said two talking conductors, and contacts on said first relay included in the bridge circuit of said supervisory relay.

24. In a telephone system, a calling line, a called line, automatic switches, a connector, an operator's position, a trunk line accessible to said connector and terminating in a jack at said position, means controlled by the calling subscriber for operating said switches and connector to extend a connection to said trunk, a cord circuit for connecting with said jack to complete the connection to the called line, means for releasing said switches to normal responsive to the calling subscriber hanging up his receiver, a back bridge relay in said connector controlled by the called subscriber to prevent the release of the connector, said back bridge relay being deenergized when the called subscriber hangs up, means in said cord circuit for again operating said back bridge relay, a slow acting relay controlled by said back bridge relay for preventing the release of the connector during the interval that the said back bridge relay is deenergized, and means controlled by the slow acting relay for making said connector busy to switches having access thereto until said cord circuit is removed from said jack.

25. In a telephone system, a calling line, a called line, a train of switches for extending a connection from said calling line to said called line, a line relay and first and second slow-releasing relays controlled by said calling subscriber to govern the setting of the last switch of the train, said first slow relay being operable over a front contact of said line relay and said second slow relay being operable over a back contact of said line relay and a front contact of said first slow relay, a holding circuit extending from the last switch of the train to the preceding switches, a first ground connection for said holding circuit controlled by said first slow relay, a second ground connection for said holding circuit controlled over a back contact of said second slow relay, a resistance for insertion in series with said second slow relay to render it quicker to release, and circuit connections whereby when said calling subscriber restores his receiver before said called subscriber, said line relay releases followed in succession by the operation of said second slow relay to open said second ground connection, by the release of said first slow relay to open said first ground connection, thereby causing the release of preceding switches, and by the release of said second slow relay to again apply said second ground connection to thereby render said lineswitch unselectable.

26. In a telephone system, a switch, an operator's position, a trunk, and means responsive to the passage of current over said trunk for establishing and maintaining a busy condition at the operator's position and a holding circuit for the switch regardless of subsequent changes of current over said trunk.

27. In a telephone system, a switch, an operator's position, a trunk, means responsive to the passage of current in either direction over said trunk for establishing and maintaining a busy condition at the operator's position and a holding circuit for the switch regardless of subsequent reversals of current over said trunk.

28. In a telephone system, a selector switch, an operator's position, a trunk terminating at one end in said switch and at said position, and means in said trunk responsive on the seizure of the trunk by said switch and the transmission of current thereover for establishing a busy condition for said trunk at the operator's position and for establishing a holding circuit for the switch, said means being maintained actuated regardless of the direction of the current transmitted over said trunk at the time of the seizure thereof and of subsequent reversals in the direction of said current.

In witness whereof, I hereunto subscribe my name this 23d day of October, A. D. 1930.

CLARENCE E. LOMAX.